July 30, 1929.   J. E. JOHNSON   1,722,633
FLUID PRESSURE BRAKE
Filed Sept. 21, 1927

INVENTOR.
Julian E. Johnson
BY J. Daniel Stuwe
ATTORNEY.

Patented July 30, 1929.

1,722,633

UNITED STATES PATENT OFFICE.

JULIAN E. JOHNSON, OF CHICAGO, ILLINOIS.

FLUID-PRESSURE BRAKE.

Application filed September 21, 1927. Serial No. 220,906.

This invention relates to fluid pressure brakes, and more particularly to a means of recharging them without taking air from the brake pipe for the purpose.

Heretofore the brake pipe has assumed two functions, recharging and controlling. The control function consists of actuating the triple valves on the cars by varying the pressure in the brake pipe. Thus during release, an influx of air is admitted to the brake pipe at the front or operating end, whence it travels back through the train, moving the triple valves to release-and-charging position, in which position feed grooves or ports are uncovered so that air from the brake pipe passes through to recharge the auxiliary reservoirs. This taking of air from the brake pipe for recharge purposes works directly against its effectiveness as a control means; the release impulse becomes weaker and less positive as it moves back through the train, with the result that the rear cars do not release in unison with the front cars, causing slid wheels on the rear cars and jerky operation. Many inventions have sought to lessen this familiar difficulty.

This invention seeks to remove the difficulty entirely by devoting the brake pipe to the control function only, and providing means for recharging the auxiliary reservoirs wholly from a supply means other than the brake pipe. To help clarify the novelty herein claimed I shall mention certain electric railway equipment, now in operation, which may seem to resemble my invention until differences are pointed out. Such equipment has an air compressor on each motor car; a supply pipe, separate from the brake pipe, unifies these supply sources, and, in aiding the brake pipe to recharge the auxiliary reservoirs, it replaces supplementary reservoirs as a means of achieving the graduated release feature. The brake pipe, however, still has the two functions of control and recharge, with the disadvantages above stated. Novelty in this application is that the brake pipe, instead of being both a control and recharge means, becomes a control means exclusively, variations in its pressure serving to actuate uniformly the triple valves throughout the train.

A further novelty is that the auxiliary reservoir, instead of being recharged from the brake pipe with a small amount of assistance from the supply pipe, is here recharged wholly from a source other than the brake pipe. Other objects and advantages will appear from the following more detailed description of the invention.

Figure 1:
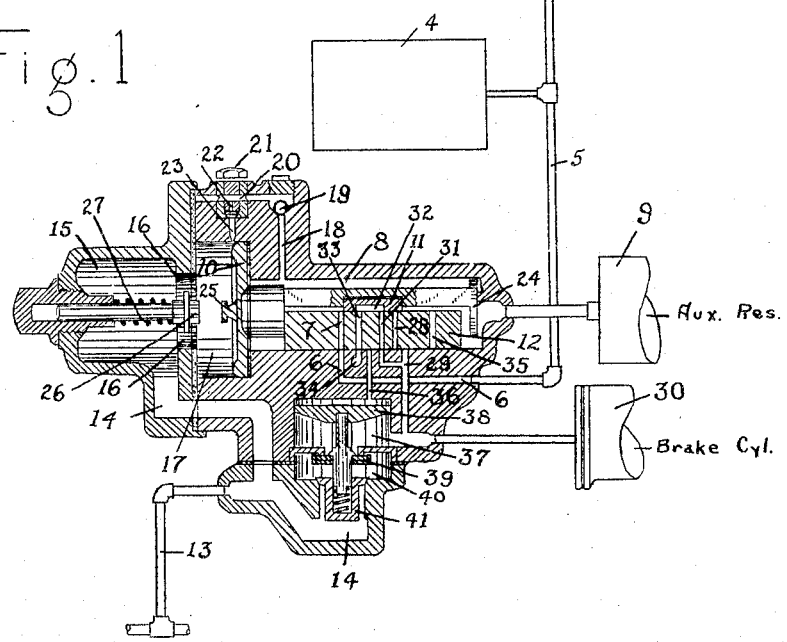
Figure 2:
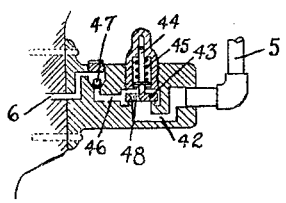

In the accompanying drawings, Fig. 1 is a combination sectional and diagrammatic view of a fluid brake equipment embodying my invention. Fig. 2 is a sectional view of a portion which may be added to the construction shown in Fig. 1, as increasing the safety and positiveness of the operation.

In Fig. 1 of the drawings, 1 indicates an air compressor; 2, a main reservoir; 3, a feed valve; 4, a supply reservoir which may be used to increase the volume of the supply pipe 5; and 6, a passage through the triple valve body, leading from supply pipe's junction with the triple valve to the seat of the slide valve 12. If, during the initial stage of charging the system, the triple valve chances to be in release-and-charging position, port 7 in the slide valve 12 registers with supply passage 6 so that fluid under pressure passes through to valve chamber 8 which opens to the auxiliary reservoir 9, soon shifting piston 10 and graduating valve 11 to the left, blanking port 7 through the slide valve, and stopping the flow into chamber 8. When the brake valve (not shown) is moved to release-and-charging position, fluid under pressure moves through brake pipe 13, passage 14, chamber 15, passages 16, to piston chamber 17 on the left face of the piston 10; the pressure to left or in front of piston becoming greater than that to right or rear of piston in chamber 8, the piston 10, graduating valve 11 and slide valve 12 move to the extreme right, which is release-and-charging position as shown in Fig. 1. Should the flow from port 7 increase the pressure at rear of piston more rapidly than the brake pipe increases the pressure at front of piston, the piston and graduating valve merely move to the left, blanking port 7, until the pressure in chamber 17 again predominates.

Assuming the brake system to be charged, a service application of the brakes is effected by reducing the brake pipe pressure as usual. The triple valve piston moves to the left, first causing a relative movement of the graduating valve 11 to uncover the port 28. The spider 24 of the piston engages the slide valve 12, shif port 28 registers with the left hand branch of passage 29 leading to the brake cylinder 30. The movement leftward is limited by button 25 against graduating stop 26 and the resistance of spring 27. Fluid under pressure is free to flow from valve chamber 8 and auxiliary reservoir 9 to the brake cylinder, causing an ordinary service application of the brakes.

Upon a sudden reduction of brake pipe pressure, the piston 10 is shifted to emergency position, the button 25 compressing graduating stop 26 and spring 27, so that large port 35 registers with large branch of passage 29 to brake cylinder. In this extreme leftward position port 28 registers with passage 36, opening auxiliary pressure into emergency piston chamber 37, depressing emergency piston 38 which opens vent valve 39, permitting the fluid under pressure in chamber 40 to flow to the brake cylinder through the passages shown. When the pressure in chamber 40 is less than the pressure in brake pipe passage 14 below check valve 41, the latter unseats, permitting brake pipe air to flow to the brake cylinder. This venting of brake pipe air is primarily to effect a quicker serial action of the triple valves through a long train than could be afforded by venting the brake pipe only through the brake valve's emergency exhaust port to the atmosphere.

Upon increasing the brake pipe pressure to release the brakes, the pressure in chamber 17 becomes greater than that in chamber 8, causing the piston, graduating valve and slide valve to return to release-and-charging position. Charging occurs as previously described. Releasing occurs through left branch of passage 29 from the brake cylinder, port 31 through the slide valve, cavity 32 in the graduating valve, port 33 in the slide valve, and passage 34 to the atmosphere. The pressure above the emergency piston 38, referred to in describing the emergency application, escapes around that piston, which is loose fitting, and passes through passage 29 either to the brake cylinder or the atmosphere, according to which position the triple valve is in.

Passage 18 affords a one-way communication between chambers 8 and 17. If pressure in chamber 8 be slightly greater than that in chamber 17, fluid moves from chamber 8, through passage 18, past check 19, into annular groove 20 in plug 21, through choke port 22, and into passage 23 which leads into chamber 17 when piston is in release-and-charging position. A difference in pressure between chambers 8 and 17 may be too slight to move piston and graduating valve, yet ample to lift the ball check 19; if the difference becomes greater, enough to move the piston and graduating valve, passage 23 to chamber 17 is blanked by the piston 10. Fluid flows through this passage under two circumstances. During a release, particularly in a long train, when the pressure in chamber 8 may increase more rapidly than that in chamber 17, a small flow occurs through passage 18, using the excess in chamber 8 to assist locally in recharging the brake pipe, thus making release more rapid and positive. However, this provision does not sacrifice the positiveness of the graduated release feature, because the rate of flow into chamber 8 through port 7 is more rapid than the rate of flow out of chamber 8, through choked passage 22, into chamber 17; hence when the brake valve is moved from release to lap, chamber 8 speedily attains a predominance in pressure over chamber 17, which shifts the piston and graduating valve to release lap, blanking charging port 7 and brake cylinder exhaust port 31. Passage 18 has this second value: when the train is running with brakes released, the brake pipe pressure may fluctuate slightly; when the fluctuation is downward, passage 18 permits fluid to move from chamber 8 to chamber 17, thereby preventing unintended brake applications.

It will be noted that by not taking fluid from the brake pipe for recharging purposes, a release impulse moves back through the train with unlessened force, affecting front and rear triple valves uniformly.

In Fig. 2 is shown an auxiliary valve means or portion which may be interposed in the supply channel and preferably affixed to the triple valve body at the point where supply pipe 5 joins passage 6. In Fig. 2, fluid under pressure moves from pipe 5, through passage 42, through small feed 48 bored through check valve 43, thence through passage 46, past check 47, and on into passage 6. The purpose of check 47 is, in case of a rupture in pipe 5, the pressure in auxiliary reservoir 9 will not escape to the atmosphere, but can be used to stop the train. The check valve 43, with its stem 44 and spring 45, opens wide only when there is a marked difference in pressure in passage 42 below it and passage 46 above it; this difference exists during all of a recharge of the auxiliary except the last part of it, when check valve 43 seats and flow is confined to small feed 48. The purpose of this check valve is to insure that triple valve piston can not move to lap due to the possibly more rapid rate of flow from pipe 5 to chamber 8 than from the brake pipe to chamber 17, and remain in lap when the recharge is nearly completed. To illustrate in greater detail: Assume that the feed valve is set at 70 pounds, which means that when the pressure in both chambers 8 and 17 is 70 pounds per square inch, the brake is fully charged; assume also that a predominance of one pound per square inch is needed to shift the piston and graduating valve; a possibility then occurs that chamber 8 may attain slightly more than 69 pounds when chamber 17 has attained only 68; the piston and graduating valve is then forced to release lap, blanking port 7 as well as the brake cylinder exhaust port 31; the brake pipe recharge continues up to the full 70 pounds, which means then that chamber 17 has 70 pounds, with chamber 8 at slightly more than 69 pounds, with the result that the triple valve remains in lap, with air possibly imprisoned in the brake cylinder. The portion shown in Fig. 2 acts to slow up the last part of the recharge of chamber 8, thus providing greater certitude that the piston can not be moved to lap at the conclusion of a recharge and there remain.

It is apparent from the above disclosure that Fig. 1 embodies my invention in its simplest form; and that Fig. 2 is a possible addition thereto, which may be used as contributing added safety and certainty to the action.

It is understood that my invention may be exemplified in forms other than that shown; I wish to include its application in valve forms similar to triple valve though called by other trade names; or in valves whose pistons work vertically as well as in those whose pistons work horizontally as shown herein.

What I claim as my invention and desire to secure by Letters Patent is:

1. In a fluid pressure brake device, valve means with a piston having a brake pipe control pressure on one face, and a one-way by-pass enabling flow of fluid therethrough only toward said control face of the piston, when in release position, for preventing unintended movement of said valve means and piston away from release position.

2. In a fluid pressure brake device, valve means with a piston having brake pipe control pressure on one face, and a fluid passage with a choke port and a one-way check valve, for enabling flow of fluid only toward said control face when in release position, for preventing unintended movement of said piston away from release position.

3. In a fluid pressure brake, the combination, with a brake pipe and an auxiliary reservoir, of valve means and a piston having auxiliary reservoir pressure on the rear of the piston and brake pipe control pressure on the front of the piston, and a one-way by-pass around said piston to enable flow of fluid only from the rear to the front of said piston while in release position, for preventing unintended movement of the valve means away from release position due to slight downward fluctuation of the brake pipe control pressure.

4. In a fluid pressure brake, the combination, with a brake pipe, an auxiliary reservoir and a supply source, of valve means with a piston and chambers providing auxiliary reservoir pressure on the rear of the piston and brake pipe control pressure on the front thereof, and a one-way by-pass with a choke port enabling flow of fluid from the rear to the front of the piston, but not from the front to the rear thereof, said by-pass and chambers being adapted to aid in recharging the brake pipe locally from the auxiliary reservoir.

5. In a fluid pressure brake, the combination, with a brake pipe, an auxiliary reservoir and a supply source, of valve means with a piston having auxiliary reservoir pressure on the rear of said piston and brake pipe control pressure on the front thereof and a one-way by-pass to enable flow of fluid from the rear of the piston to the front of said piston only, the brake pipe thus serving exclusively as a brake control pipe, and means, included in said valve means, provided with passages for recharging said auxiliary reservoir exclusively from said supply source, and not from said brake control pipe, said passages being not connected with said brake control pipe while in charging position.

6. In a fluid pressure brake device provided with an auxiliary reservoir and a supply source, a housing having an inner chamber communicating with said auxiliary reservoir, also a passage connected with said supply source, and valve means with a port registerable directly with said chamber and directly with said passage while said valve is at release position.

7. In a fluid pressure brake device provided with an auxiliary reservoir and a supply source, a housing having an inner chamber communicating with said auxiliary reservoir, also a passage connected with said supply source, a valve having a port registering directly with said chamber and directly with said passage while said valve is at release position, and a graduating valve for blanking said port so as to obtain the graduated release feature.

8. In a fluid pressure brake, the combination, with a brake pipe, an auxiliary reservoir and a supply source, of valve means operated by variations in pressure in fluid in said brake pipe and wherewith said brake pipe serves exclusively as a brake control pipe, said valve means having passages, not connected with said brake control pipe while in charging position, for recharging said auxiliary reservoir exclusively from said supply source, and auxiliary valve means connected to the first said valve means for slowing up the last part of the recharge from said supply source to the auxiliary reservoir for holding the first said valve means in full release position at the end of a recharge.

9. In a fluid pressure brake, the combination, with a brake pipe, an auxiliary reservoir and a supply source, of valve means including a piston and a housing having an inner chamber adjacent said piston and communicating with the auxiliary reservoir, and having a passage connected with said supply source, said valve means having a port registerable directly with said chamber and with said passage while the piston is at release position, to recharge said reservoir exclusively from said supply source, and auxiliary valve means interposed between said supply source and said passage in the housing, for slowing up the last part of the recharge from the supply source to the auxiliary reservoir side of the piston, to enable the normal recharge of brake pipe control pressure to hold the piston positively in full release position at the end of a recharge.

In testimony whereof I have signed my name to this specification.

JULIAN E. JOHNSON.